United States Patent [19]
Otto

[11] 3,868,325
[45] Feb. 25, 1975

[54] FILTER TUBE ADAPTERS
[75] Inventor: Walter Otto, Wantagh, N.Y.
[73] Assignee: Sethco Manufacturing Corp., Freeport, N.Y.
[22] Filed: Aug. 24, 1973
[21] Appl. No.: 391,440

[52] U.S. Cl.............. 210/232, 210/315, 210/437, 210/446, 210/457, 210/489, 210/492, 210/497
[51] Int. Cl............................................. B01d 27/00
[58] Field of Search...... 55/498, 500; 210/232, 314, 210/315, 488, 497, 441, 454, 457, 459, 460, 461, 462, 463, 489, 492, 541, 437, 446

[56] References Cited
UNITED STATES PATENTS

| | | | |
|---|---|---|---|
| 3,394,815 | 7/1968 | Harms et al. | 210/497 |
| 3,406,831 | 10/1968 | Bush et al. | 210/497 |
| 3,503,516 | 3/1970 | Harms et al. | 210/497 |
| 3,695,443 | 10/1972 | Schmidt, Jr. | 210/497 |

Primary Examiner—John Adee
Assistant Examiner—F. F. Calvetti
Attorney, Agent, or Firm—Breitenfeld & Levine

[57] ABSTRACT

Adapters for insertion into the ends of a filter tube comprising a cylindrical mesh core supporting a fibrous winding. Each adapter includes a sharp annular edge for biting into the interior of the core to prevent inadvertent relative movement between the adapter and core. Each adapter includes a frustoconical flange having a sharp edge for pressing into the fibrous winding to maintain engagement with the winding even when the latter shrinks longitudinally. One of the adapters is formed with a through bore, to permit flow of liquid out of the filter tube interior, and an annular groove carrying an O-ring. The other adapter has a reduced diameter stem adapted to be accommodated by a seat in the filter chamber.

8 Claims, 3 Drawing Figures

PATENTED FEB 25 1975 3,868,325

FILTER TUBE ADAPTERS

This invention relates to filter units of the type employing hollow cylindrical filter tubes, and more particularly to adapters for engaging the ends of a filter tube and supporting the tube in the filter unit.

Filter units currently employed to remove impurities from solutions used in electroplating processes generally include a bank of filter tubes vertically supported in a chamber. Typically, a filter tube includes a cylindrical mesh core and a fibrous winding around the entire outside surface of the core for filtering fluid flowing through the winding from the chamber to the interior of the core. The filter tube is fitted with a pair of end closures, each closure being in abutment with one of the ends of the fibrous winding to prevent fluid from entering the interior of the tube without first being filtered through the winding. Generally, the filtered fluid within the tube is coupled to a conduit via a passageway in one of the end closures. It is known that the fibrous windings of filter tubes, such as described, tend to shrink longitudinally and as a result the ends of the wound fibrous tube tend to move away from the end closures. If this is permitted, unfiltered fluid will seep into the filter tube interior, because of the separation which occurs between the end closures and the ends of the tube, and contaminate the filtered liquid within the tube. To avoid this possibility, it is common to employ bias means to maintain the end closures in abutment with the ends of the tubes as the tube winding shrinks. In the past, the bias means have been provided by resilient inserts mounted under compression between the end closures and the wall of the chamber. Use of the resilient inserts has added to the cost of filter units as well as the complexity of assembling and disassembling the units each time it is necessary to change fouled filter tubes.

It is an object of the present invention to provide end adapters for filter tubes which obviate the need for the previously used end closures and resilient inserts.

In summary, the invention provides a pair of adapters, each adapter being coupled to a different one of the ends of the filter tubes, each of the adapters having an annular edge for biting into the inner surface of the mesh core to secure the adapter to the core, and a conical flange which can be pressed into its respective end of the fibrous winding. When shrinkage of the winding occurs, the circular edge of each adapter flange remains engaged with the end of the winding thereby maintaining the liquid tight seal created by the engagement of the winding by the flange edge on the adapter.

The foregoing and other objects and features of the invention are incorporated in the example now to be described with reference to the accompanying drawings, in which.

Figure 1:
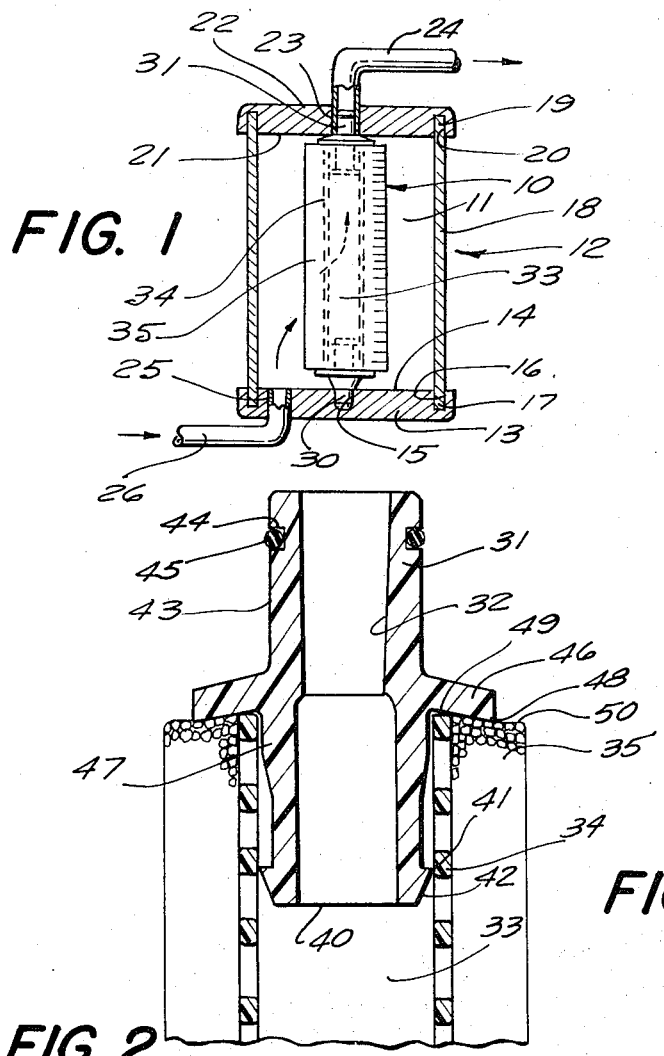
FIG. 1 is a cross-sectional view of a filter tank having a filter tube provided with adapters according to the invention.

FIG. 1 shows a filter tube 10 supported vertically within the interior 11 of a filter chamber 12. More specifically, filter chamber 12 includes a circular base plate 13 having on its upper side 14 a centrally located depression or filter seat 15 and an annular groove 16 adapted to engage in a fluid tight manner the lower end 17 of a cylindrical wall 18. The upper end 19 of the cylindrical wall 18 is engaged in a fluid tight manner within an annular groove 20 on the lower side 21 of a circular cover plate 22. Cover plate 22 includes a centrally located hole 23 to which there is coupled a fluid outlet pipe 24, and base plate 13 includes an eccentrically located hole 25 to which there is coupled a fluid inlet pipe 26. Fitted into the lower end of the filter tube 10 is an adapter 30, according to the invention, adapted to be accommodated by the seat 15 in base plate 13. Another adapter 31 according to the invention, engages the upper end of filter tube 10 and is coupled in a fluid tight manner to the inside of the pipe 24. As more fully discussed below, the adapter 31 includes an internal passageway 32 (see FIG. 2) which communicates with the interior of the filter tube. Dirty liquid entering the interior 11 of filter chamber 12 through pipe 26 passes radially through the filter tube into its interior, and the liquid then flows out through pipe 24 (see arrows in FIG. 1). As the fluid flows from the space 11 to the interior of the filter tube impurities are filtered out of the fluid, and hence the liquid leaving the filter chamber through pipe 24 is clean.

Figure 2:
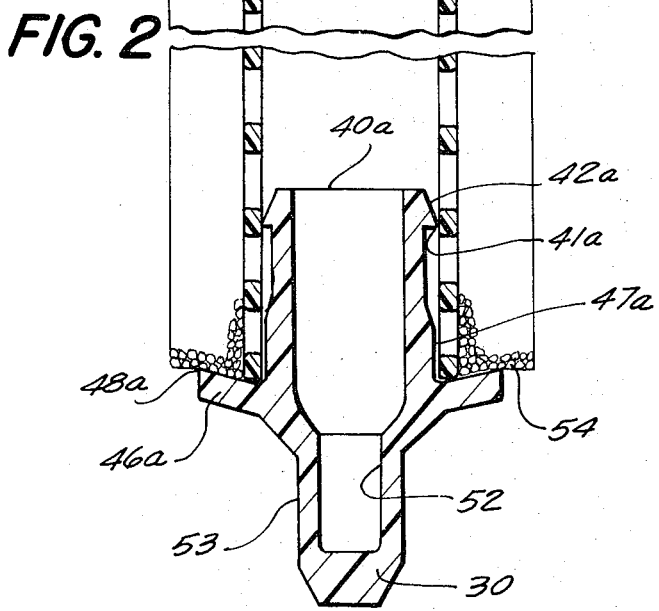
FIG. 2 is a longitudinal cross-sectional view of a filter tube assembled with adapters according to the invention, the central portion of the tube being broken away.
Figure 3:
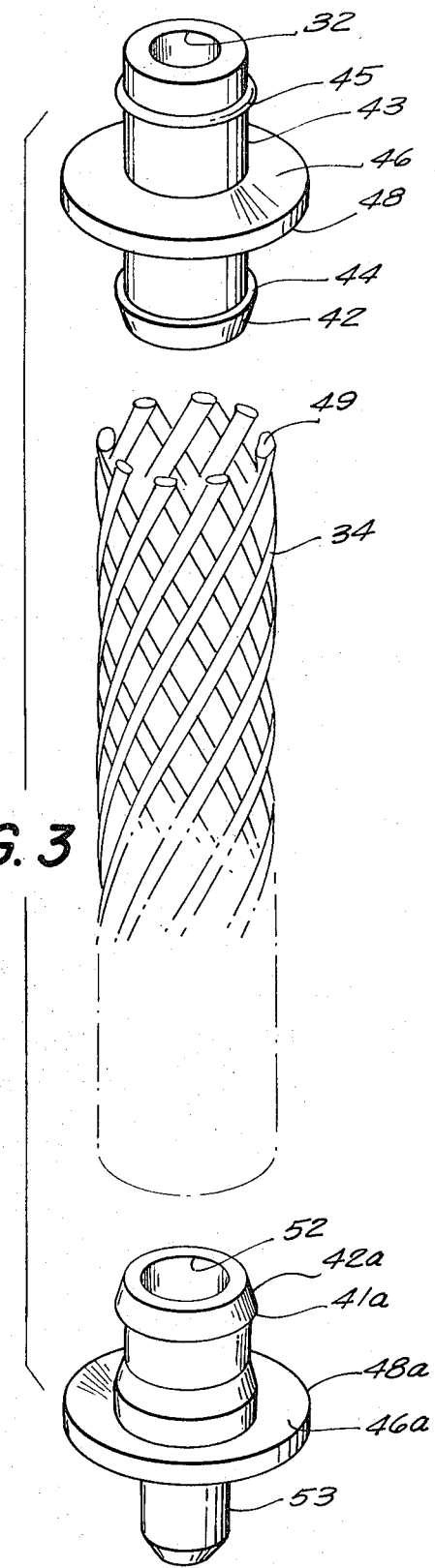
FIG. 3 is an exploded view of the adapters and mesh core of a filter tube, the fibrous winding not being shown.

It may be seen in FIGS. 2 and 3 that the filter tube 10 comprises a hollow cylindrical mesh core which, for example, may be manufactured from a plastic such as polypropylene. Referring to FIG. 2, core 34, which is relatively rigid, supports a fiber winding 35 extending along the full length of the core. The winding 35 provides a plurality of fiber layers whose interstices trap particles in fluids passing through the winding. It will be appreciated that liquids to be filtered may have impurities of various sizes, and that the size of the interstices provided by fibers having various diameters will affect the size of the particles retained by the winding. Typically, winding 35 may be formed from polypropylene thread with which retention values in the range of 1 to 150 microns can be provided. Other suitable threads for the winding include cotton or synthetic fiber such as is sold under the trademark Dynel.

Adapter 31 is unitary member formed, for example, from molded polypropylene. Adapter 31 includes near one end 40 a sharp circumferential edge or tooth 41 provided by a frustoconical projection 42 which flares outwardly from end 40 to the edge 41. A cylindrical end section 43 of adapter 31 has an annular groove 44 for supporting an O-ring seal 45. About midway between its ends, adapter 31 has a frusto-conical flange 46, and a cylindrical guide section 47 is located between the flange 46 and end 40. The axes of the circumferential edge 41, the cylindrical guide section 47, the flange 46, and the cylindrical end section 43 are aligned and coincident with the axis of passageway 32, and flange 46 is directed toward end 40.

The diamter of the circumferential edge 41 is slightly larger than the inner diameter of the core 34 and the cylindrical guide section 47 is adapted to frictionally engage an inner end section of the core tube. To assemble adapter 31 with the filter tube 10, the end 40 and guide section 47 of the adapter 31 are pushed into the core tube. During this process the conical projection 42 serves to guide the circumferential edge 41 into the core, and as the edge 41 is advanced into the core the cylindrical guide section 47 engages the inner surface of the core tube and aligns its axis with the axis of the core. As the adapter 31 is pushed into the core 34 an outer edge 48 of the flange 46 is pressed deeply into an end 50 of winding 35. The winding is compressible, and the adapter is pushed into core 34 until the flange 46 abuts the end 49 of the core. When the force applied to engage the adapter with the core is removed, winding 35, due to its inherent resilience, presses upwardly against the flange 46. This force creates a fluid tight seal between the winding and the flange, but does not move the adapter 31 outwardly because the circumferential edge 41 bites into the rough inner surface of the core 34. At this point, it should be noted that the force required to advance the circumferential edge 41 into the core is less than that which would be required to remove the edge 41 from within the core, because the edge is reinforced by the conical projection 42 so as to stiffen the edge when a force tending to withdraw the adapter is applied to the adapter. Thus, it may be seen that once the adapter 31 is inserted into the core it tends to remain in place unless positively pulled out.

As shown in FIGS. 2 and 3, adapter 30 is similar to adapter 31. Accordingly, parts on adapter 30 which are the same as those on adapter 31 have been designated with the same reference characters as used on adapter 31 followed by the letter "a." Adapter 30 differs from adapter 31 in that it does not include a through passageway 32 but instead its end opposite end 40a is closed. Adapter 30 is, however, formed with a cavity 52 to minimize the plastic material required to form the adapter. In addition, cylindrical section 43 is replaced with a reduced diameter stem 53 which fits into seat 15 in the base plate 13 of filter chamber 12. Thus, when adapter 30 is pressed into the core 34 the outer edge 48a of flange 46a presses into the end 54 of the winding 35 and circumferential edge 41a grips the inner surface of the core to hold adapter 30 in place. As a result, the flange 46a and winding end 54 provide another liquid tight seal.

As shown in FIG. 1, filter tube 10 is supported in the filter chamber by the slidable engagement of adapter 30 with seat 15 and by the slidable engagement of adapter 31 with the inside of outlet pipe 24, O-ring seal 45 providing a fluid tight seal which prevents flow of liquid in space 11 to the outlet pipe 24 without first going through the filter tube 10. Cover 22 is removable from wall 18 to permit replacement of fouled filter tubes with fresh ones.

When filter tube 10 is mounted in filter chamber 12 as described, and filtration begins, the liquid wetting the filter tube causes the winding 35 to shrink. As a result, the length of the winding is reduced. However, the flange edges 48 and 48a are so deeply pressed into the ends of winding 35 that shrinkage of the winding does not cause disengagement of the ends of the winding and edges 48 and 48a. Thus, despite the shrinkage, a liquid tight seal is maintained between the winding 35 and the adapters 30 and 31 without the need for spring pressure between the adapters and the filter tube.

It is to be understood that the description herein of a preferred embodiment according to the invention is set forth as an example thereof and is not to be construed or interpreted as a limitation on the claims which follow and define the invention.

What is claimed is:
1. In combination with a filter tube having a hollow cylindrical flexible mesh core supporting fibrous filtering material on its outer surface, a pair of adapters for insertion into the ends of said core, said adapters each including:
   a. a frusto-conical end presenting a sharp circular edge facing away from that end of the adapter, the diameter of said edge being slightly larger than the internal diameter of the filter tube core, and
   b. an outwardly projecting circular flange having sharp edge means for pressing into the end of the filtering material closest to the end of said core into which said frusto-conical end is inserted, the diameter of said flange edge means being larger than the external diameter of the filter tube core but smaller than the external diameter of the filtering material on the core,
   whereby when said adapters are inserted into the ends of the filter tube core said flange edge means are pressed into the ends of the filtering material and said frusto-conical end edge bites into the internal surface of the core to prevent inadvertent movement of the adapters in a direction out of the core.
2. Filter tube adapters as defined in claim 1 wherein one of said adapters includes a through bore to provide communication with the hollow interior of the filter tube core.
3. Filter tube adapters as defined in claim 2 wherein said one adapter includes a cylindrical section having an annular groove for supporting an O-ring, said flange being located between the frusto-conical end edge and the annular groove.
4. Filter tube adapters as defined in claim 1 wherein the other of said adapters includes a reduced diameter stem on the side of said flange opposite said frusto-conical end.
5. Filter tube adapters as defined in claim 1 wherein each adapter includes a cylindrical guide section between its flange and the frusto-conical end edge, said guide section being slidably engageable with the inner surface of the filter tube core for aligning the axis of the annular edge with the axis of the core during assembly of the filter tube.
6. Filter tube adapters as defined in claim 1 wherein the flange of each adapter has a frusto-conical shape and diverges toward said frusto-conical end.
7. Filter tube adapters as defined in claim 1 wherein each adapter is a one-piece molded plastic element.
8. A filter tube assembly comprising:
   a. a filter tube including a hollow cylindrical flexible mesh core supporting fibrous filtering material on its outer surface, and
   b. a pair of adapters supported by the ends of said filter tube, each adapter including:
      I. a section within said filter tube, said section having a frusto-conical end presenting a sharp circular edge facing away from that end of the adapter, the diameter of said edge being slightly larger than the internal diameter of said core, so that said edge bites into the internal surface of the core and prevents inadvertent movement of said section out of said filter tube, and
      II. an outwardly projecting circular flange having sharp edge means pressing into the end of said filtering material closest to the end of said core within which said frusto-conical end is located, the diameter of said flange edge means being larger than the external diameter of said core but smaller than the external diameter of said filtering material.

* * * * *